(12) United States Patent
Tan et al.

(10) Patent No.: US 11,402,040 B2
(45) Date of Patent: Aug. 2, 2022

(54) CLAMP CONNECTOR AND A CONNECTING COMPONENT INCLUDING THE CLAMP CONNECTOR

(71) Applicant: WEIFANG 100TONG CASTING CO., LTD., Weifang (CN)

(72) Inventors: Yan Tan, Weifang (CN); Yanjun Wang, Weifang (CN)

(73) Assignee: WEIFANG 100TONG CASTING CO., LTD., Weifang (CN)

( * ) Notice: Subject to any disclaimer, the term of this patent is extended or adjusted under 35 U.S.C. 154(b) by 297 days.

(21) Appl. No.: 16/572,647

(22) Filed: Sep. 17, 2019

(65) Prior Publication Data
US 2020/0408339 A1    Dec. 31, 2020

(30) Foreign Application Priority Data
Jun. 26, 2019  (CN) .......................... 201910560448.1

(51) Int. Cl.
*F16L 17/04*  (2006.01)
*F16L 21/06*  (2006.01)
(Continued)

(52) U.S. Cl.
CPC .............. *F16L 23/04* (2013.01); *F16L 17/04* (2013.01); *F16L 21/06* (2013.01); *F16L 23/22* (2013.01)

(58) Field of Classification Search
CPC . F16L 23/04; F16L 23/22; F16L 21/06; F16L 21/065; F16L 23/08; F16L 17/04; F16L 21/005
(Continued)

(56) References Cited

U.S. PATENT DOCUMENTS 3,964,773 A * 6/1976 Stade ...................... F16L 23/08
                                                                    285/367
4,702,499 A * 10/1987 deRaymond ............ F16L 23/08
                                                                    285/367
(Continued)

FOREIGN PATENT DOCUMENTS

CN       201748094 U      2/2011
CN       102057201 A      5/2011
(Continued)

*Primary Examiner* — Matthew Troutman
*Assistant Examiner* — William S. Choi
(74) *Attorney, Agent, or Firm* — Bayramoglu Law Offices LLC

(57) ABSTRACT

A clamp connector includes a first clamp ring component, wherein the first clamp ring component includes two end portions, where one end portion is provided with two stress structures, and a mounting space; a second clamp ring component, wherein the second clamp ring component includes additional two end portions, one end portion is provided with a fixing structure capable of being mounted in or dismounted from the mounting space, and the fixing structure fits with the two stress structures; and both the one end portion of the first clamp ring component and one end portion of the second clamp ring component are provided with mechanisms for locking. When the one end portion of the first clamp ring component and the one end portion of the second clamp ring component are tightly locked, the two stress structures and the fixing structure are in a squeezed and close fit state.

18 Claims, 11 Drawing Sheets

(51) Int. Cl.
*F16L 23/04* (2006.01)
*F16L 23/22* (2006.01)

(58) Field of Classification Search
USPC .......................... 285/337, 367, 373, 419, 420
See application file for complete search history.

(56) References Cited

U.S. PATENT DOCUMENTS

| | | | | |
|---|---|---|---|---|
| 4,940,261 | A * | 7/1990 | Somers Vine | F16L 17/04 |
| | | | | 285/373 |
| 5,018,768 | A * | 5/1991 | Palatchy | F16L 21/06 |
| | | | | 285/367 |
| 5,282,654 | A * | 2/1994 | Hendrickson | F16L 17/04 |
| 7,712,796 | B2 | 5/2010 | Gibb et al. | |
| 8,556,302 | B2 * | 10/2013 | Dole | F16L 21/005 |
| | | | | 285/367 |
| 9,518,684 | B2 * | 12/2016 | Juzak | |
| 2010/0001521 | A1 * | 1/2010 | Vandal | F16L 21/06 |
| | | | | 285/337 |

FOREIGN PATENT DOCUMENTS

| | | | | | |
|---|---|---|---|---|---|
| CN | 109442108 | A | * | 3/2019 | ............. F16L 21/06 |
| GB | 2161882 | A | * | 1/1986 | ............. F16L 21/06 |

\* cited by examiner

US 11,402,040 B2

CLAMP CONNECTOR AND A CONNECTING COMPONENT INCLUDING THE CLAMP CONNECTOR

CROSS REFERENCE TO THE RELATED APPLICATIONS

This application is based upon and claims priority to Chinese Patent Application No. 201910560448.1, filed on Jun. 26, 2019, the entire contents of which are incorporated herein by reference.

TECHNICAL FIELD

The present disclosure relates to the technical field of pipe connecting clamps, in particular to a clamp connector and a connecting component including the clamp connector.

BACKGROUND

The connection operation using connectors in pipeline construction is usually aligning openings of two pipes to be connected, and connecting the two pipes by mounting a special connector. However, since pipe connection may appear in various occasions, traditional clamp connectors are relatively less handy for use at present. For example, a Chinese patent having a publication number of CN201748094U and titled as "clamping hoop-type pipe connector" discloses a clamping hoop-type pipe connector, which is indeed a connector of this kind, wherein two ends of the clamping hoop-type pipe connector are respectively fitly locked by bolts. For this structure, both ends of the connector are required to be fixed, resulting in a heavy workload. Moreover, each end of the connector having such a structure is necessary to be provided with a flange for providing a through hole fitted with the bolts. Therefore, an area of the flange is relatively large, and a material consumption is also relatively large.

For another example, a Chinese patent having an application number of 2009801204520 and titled as "clamp connector for clamping together connecting pieces on pipelines" discloses a clamp connector, wherein an end of the clamp connector is hinged. Although only the other end of the clamp connector is needed to be locked and fixed by a bolt during installation, the hinged end has to be mounted manually or with mechanical equipment in advance.

Besides, the existing clamp connectors generally fit with sealing rings to seal and fix two pipes. For example, U.S. Pat. No. 7,712,796B2 discloses a pipe connector, wherein sealing rings of various structures are provided, and inner diameters of these sealing rings are equal to or slightly larger than an outer diameter of the pipe (referring to FIG. 1-FIG. 4). When pipes need to be connected, the pipes are inserted into the pipe connector. At that time, the sealing rings exactly contact or do not contact the pipes. After the pipes are connected, two ends of the pipe connector are locked, and the sealing rings being stressed are compressed accordingly, thereby being pressed tightly on the pipe to form a sealing structure. For this sealing structure, after the pipes are connected, the purpose of sealing is achieved by tightly locking the pipe connector and applying a pressure on the sealing ring to further act on the pipes.

In conclusion, there are difficulties and drawbacks during the practical usage of the prior art, thus it is imperative to perform an improvement.

SUMMARY

It is therefore an objective of the present disclosure to provide a clamp connector to overcome the above-mentioned drawbacks, the clamp connector has a simple structure, saves materials and is more convenient to mount.

It is another objective of the present disclosure to further provide a connecting component for further ensuring a sealing property at a joint of the pipes on the basis of a convenient mounting.

To this end, the present disclosure provides a clamp connector for clamping two connected pipes, including:

a first clamp ring component, wherein the first clamp ring component includes a first end portion and a second end portion, the first end portion is provided with two stress structures, and there is an open mounting space between the two stress structures;

a second clamp ring component, wherein the second clamp ring component includes a third end portion and a fourth end portion, the third end portion is provided with a fixing structure capable of being mounted in or dismounted from the mounting space, and the fixing structure is fitted with the two stress structures; and the second end portion of the first clamp ring component and the fourth end portion of the second clamp ring component are provided with mechanisms fitted with each other for locking, and when the second end portion and the fourth end portion are tightly locked, the two stress structures and the fixing structure are in a squeezed and close fit state. Since the open mounting space is employed, the clamp connector of the present disclosure can be more applicable to different mounting scenarios, and an installation of the clamp connector is convenient.

As one clamp connector of the present disclosure, the mounting space is a U-shaped structure. By employing this open structure, the mounting and releasing of the fixing structure and the mounting space is more convenient.

As one clamp connector of the present disclosure, the fixing structure includes an inserting component and a limiting mechanism provided at an end of the inserting component. A width of the inserting component is slightly less than a width of the mounting space. A width of the limiting mechanism is larger than the width of the mounting space. A width setting of the inserting component not only facilitates installation, but also ensures a close fit property after the installation, uneasy to loosen. A width setting of the limiting mechanism ensures a cooperation between the limiting mechanism and the stress structure, uneasy to fall off and keeping a relatively stable stress state.

As one clamp connector of the present disclosure, edges of the limiting mechanism substantially coincide with outer edges of the two stress structures or are located in interiors of the outer edges of the two stress structures.

As one clamp connector of the present disclosure, the inserting component and the limiting mechanism are integrally formed into one piece, and an included angle between the inserting component and the limiting mechanism is slightly larger than 90°. As one of the preferred options, the included angle between the inserting component and the limiting mechanism ranges from 97° to 115°. For example, the included angle of 105° is the best option. As for a setting of the included angle, considering a pressure direction when clamped and a convenience of mounting and dismounting, a shape where the included angle is slightly larger than 90° can bear larger pressure. If the angle is overlarge, then the stress will not be stable. Thus the included angle is set from 97° to 115° accordingly. In the inventor's test process, when the included angle is set to be 105°, the clamp connector of the present disclosure has a better stability and convenience in mounting.

As one clamp connector of the present disclosure, when the fourth end portion is released from a locked state, the fourth end portion can be rotated to an effective position to make the fixing structure detach from the mounting space.

The present disclosure further provides a connecting component including the above-mentioned clamp connector, wherein the clamp connector further includes an accommodating cavity, the connecting component further includes an elastic sealing component provided in the accommodating cavity, two ends of the sealing component are provided with a first sealing ring and a second sealing ring, the first sealing ring and the second sealing ring tilt inward along an axis direction of the accommodating cavity. When connected pipe heads are inserted into the first sealing ring and the second sealing ring, two ends of the first and second sealing rings are in a close fit with the connected pipe heads, keeping airtightness.

Besides, the first clamp ring component is provided with first clamp edges formed by bending inward along a radial direction of the clamp connector; and the second clamp ring component is provided with second clamp edges formed by bending inward along the radial direction of the clamp connector. In this way, the clamp edges can fit with clamp grooves of connected pipes to improve a fixing property when the clamp edges are used to fix the connected pipes.

As one connecting component of the present disclosure, a third sealing ring is provided at a middle position of the sealing component. A fifth end portion of the third sealing ring, a sixth end portion of the first sealing ring and a seventh end portion of the second sealing ring are on a same annular surface; and inner diameters of the first sealing ring, the second sealing ring and the third sealing ring are slightly less than an outer diameter of the connected pipe. The third sealing ring is usually located at a joint of the connected pipes, and the fifth end portion of the third sealing ring in a free state, the sixth end portion of the first sealing ring and the seventh end portion of the second sealing ring are on a same horizontal plane, further ensuring the sealing property when the connected pipes are inserted.

DETAILED DESCRIPTION OF THE EMBODIMENTS

Figure 1:
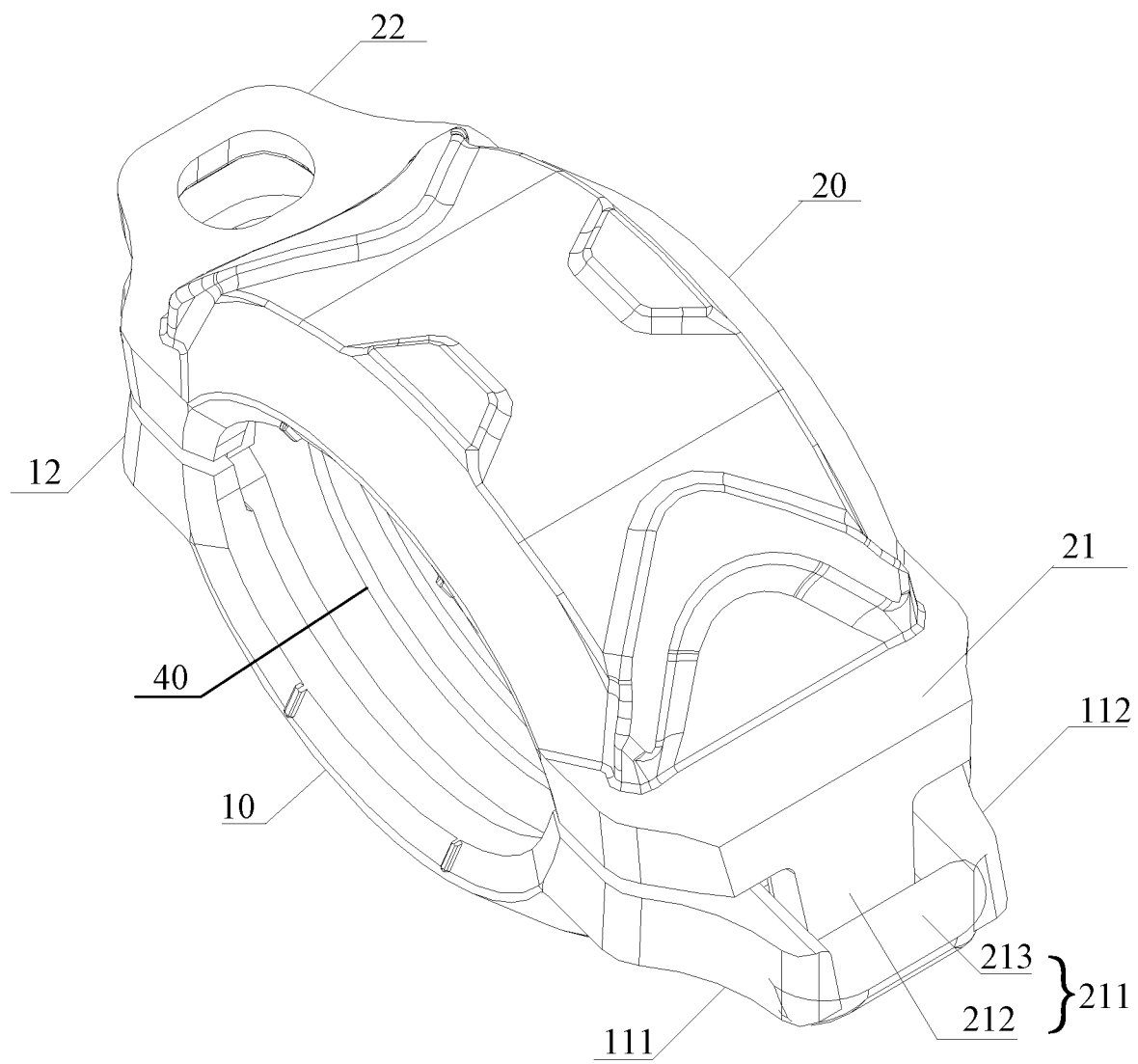
FIG. 1 is a structural schematic diagram showing a clamp connector of the present disclosure.
Figure 2A:
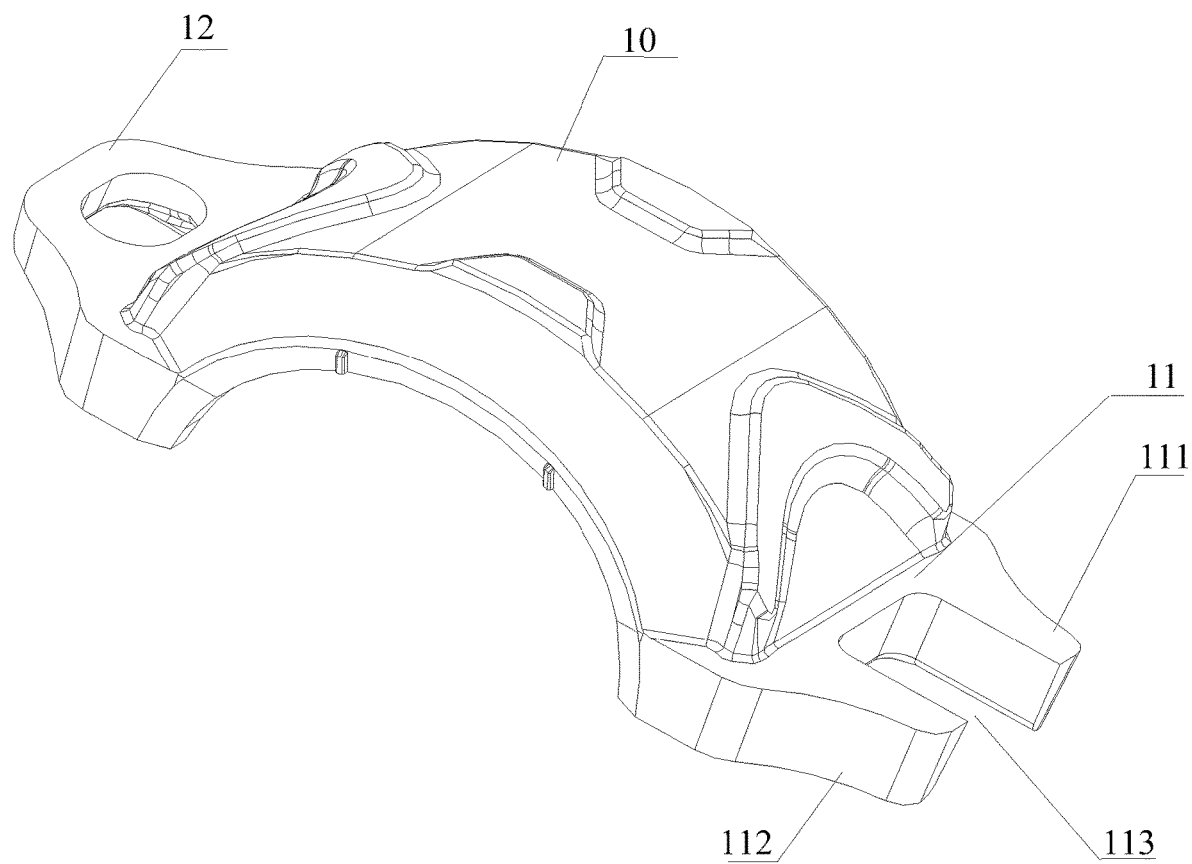
FIG. 2A is a structural schematic diagram showing a first clamp ring component of the present disclosure.
Figure 2B:
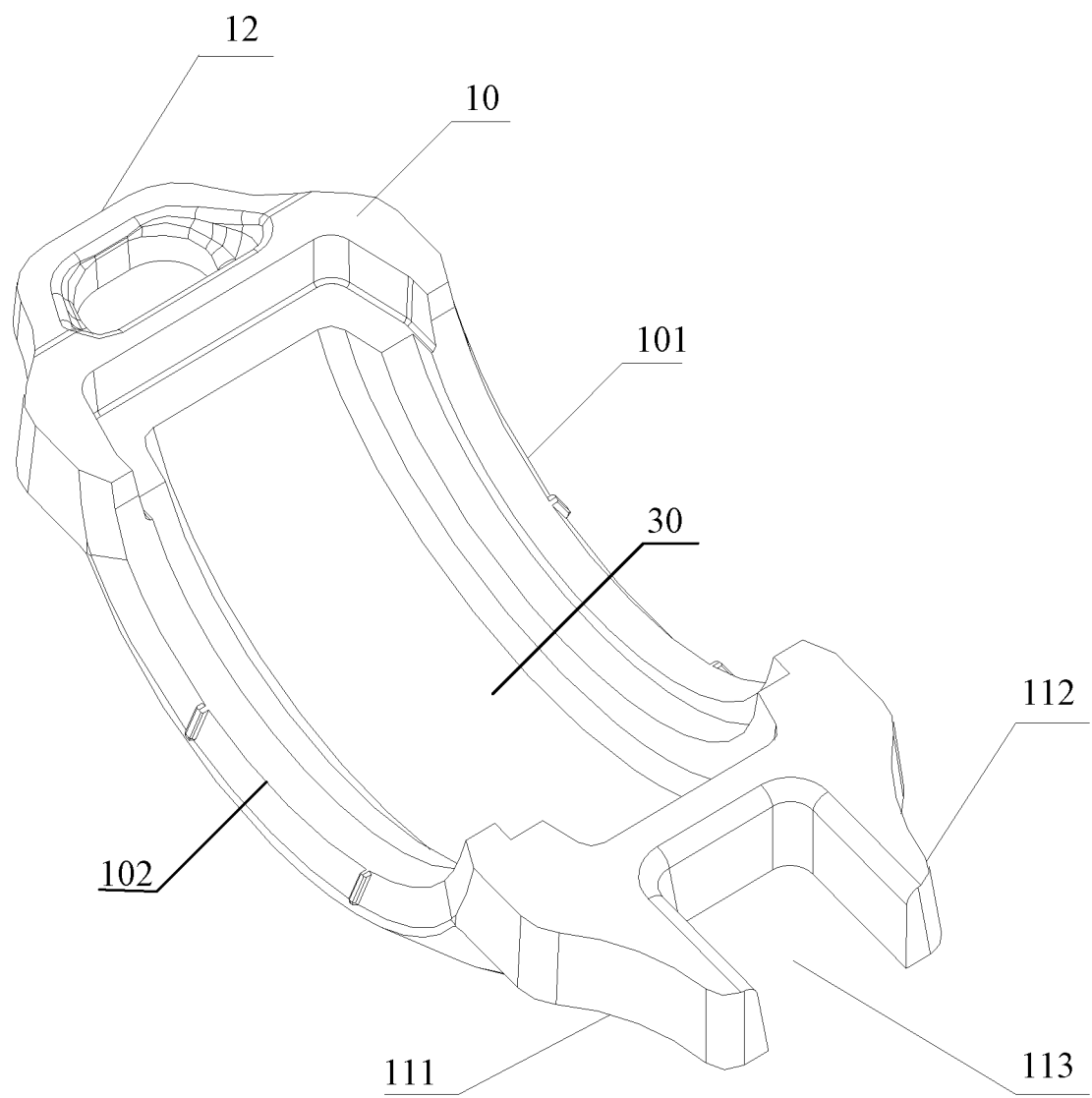
FIG. 2B is another structural schematic diagram of the first clamp ring component of the present disclosure.
Figure 3A:
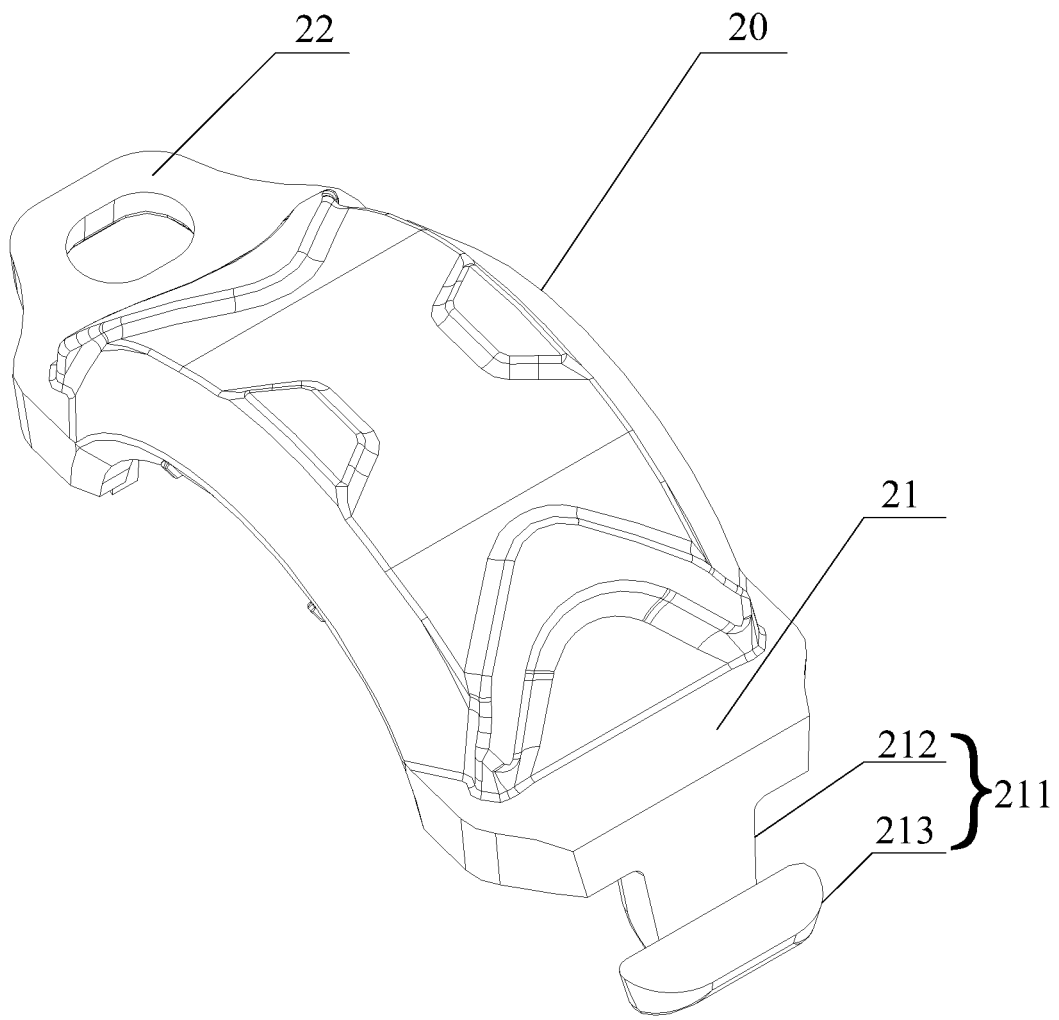
FIG. 3A is a structural schematic diagram showing a second clamp ring component of the present disclosure.
Figure 3B:
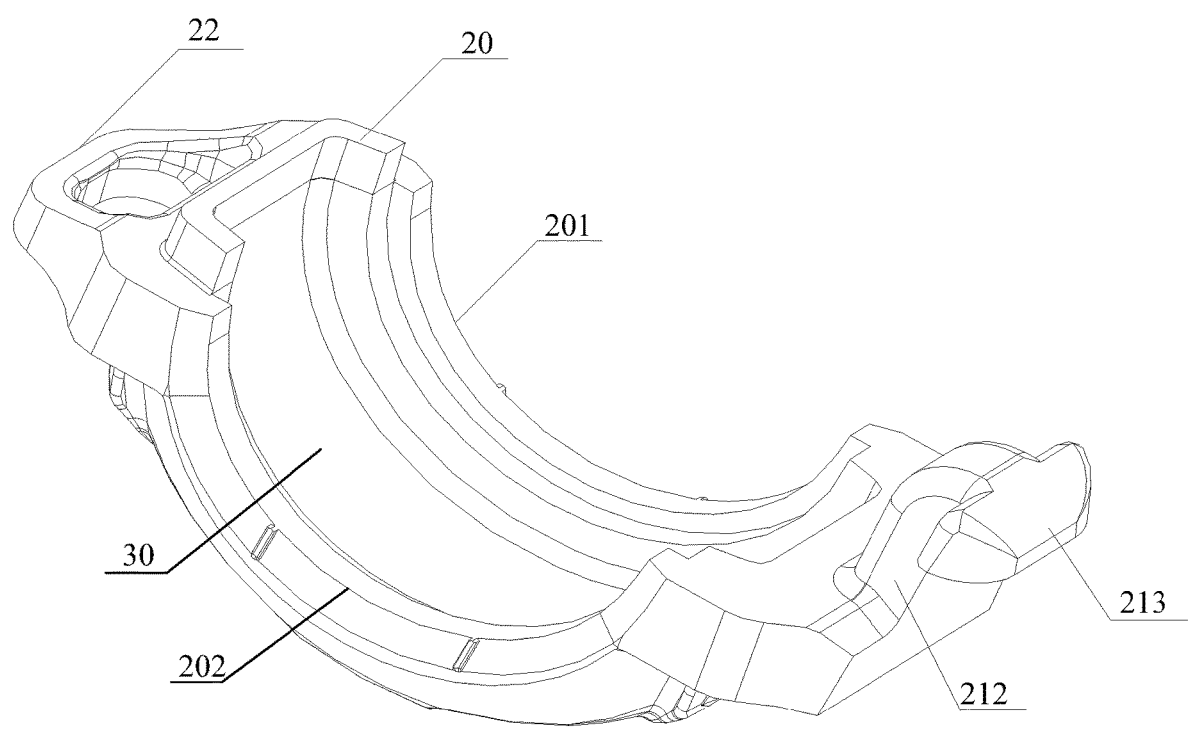
FIG. 3B is another structural schematic diagram of the second clamp ring component of the present disclosure.
Figure 4:
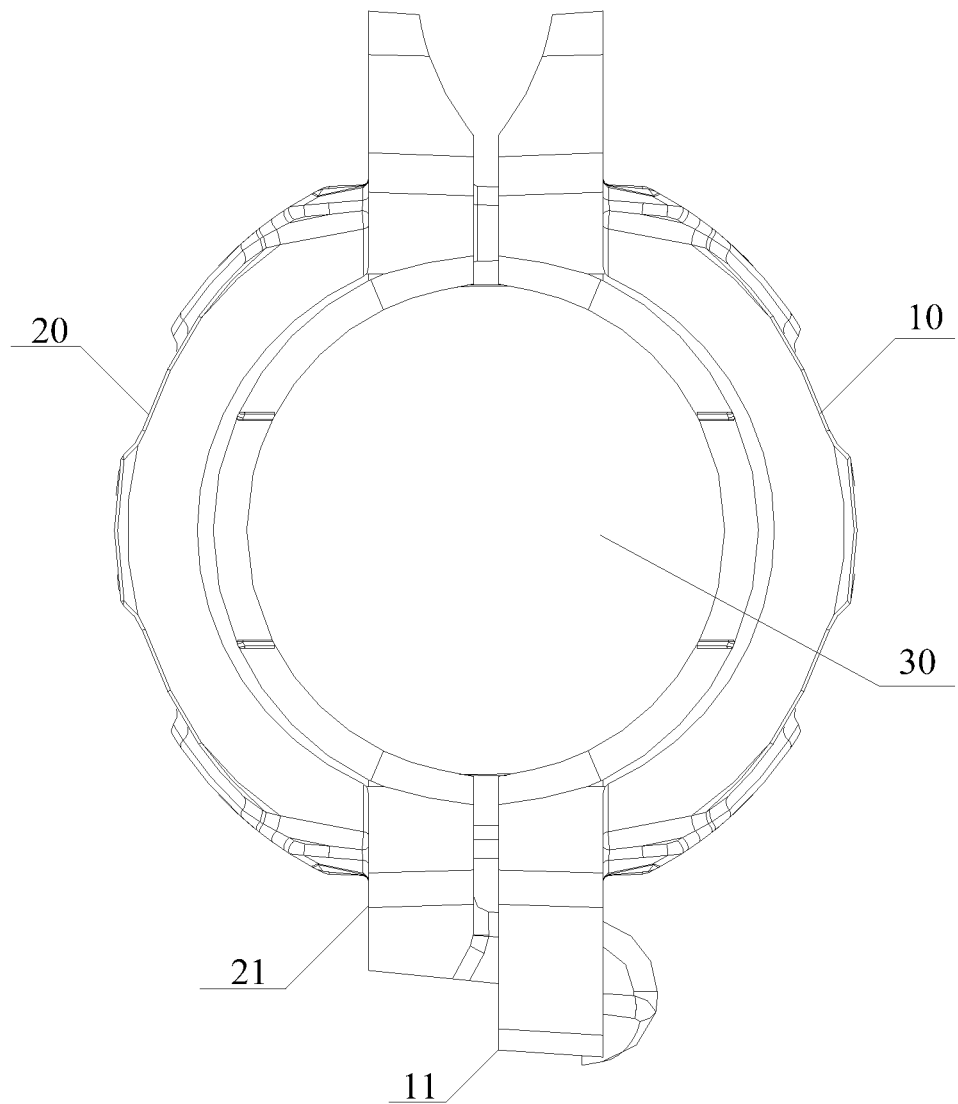
FIG. 4 is another structural schematic diagram of the clamp connector of the present disclosure.
Figure 5A:
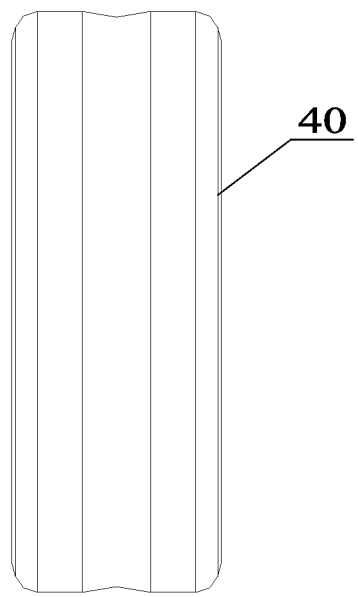
FIG. 5A is a structural schematic diagram showing a sealing component of the present disclosure.
Figure 5B:
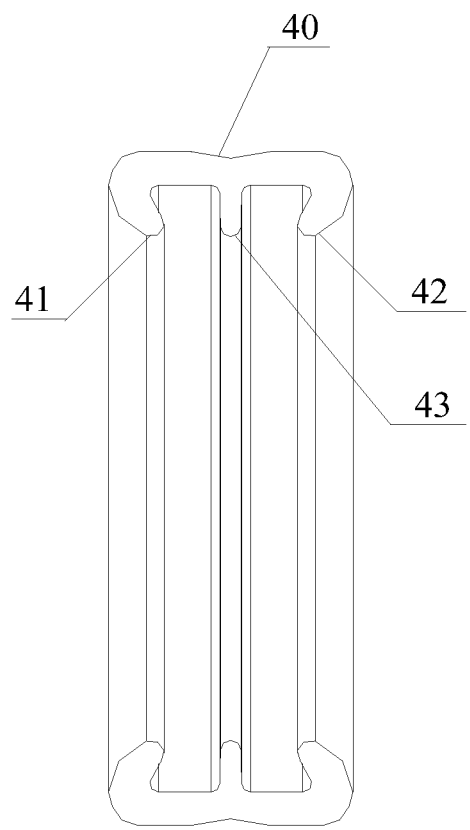
FIG. 5B is another structural schematic diagram of the sealing component of the present disclosure.
Figure 5C:
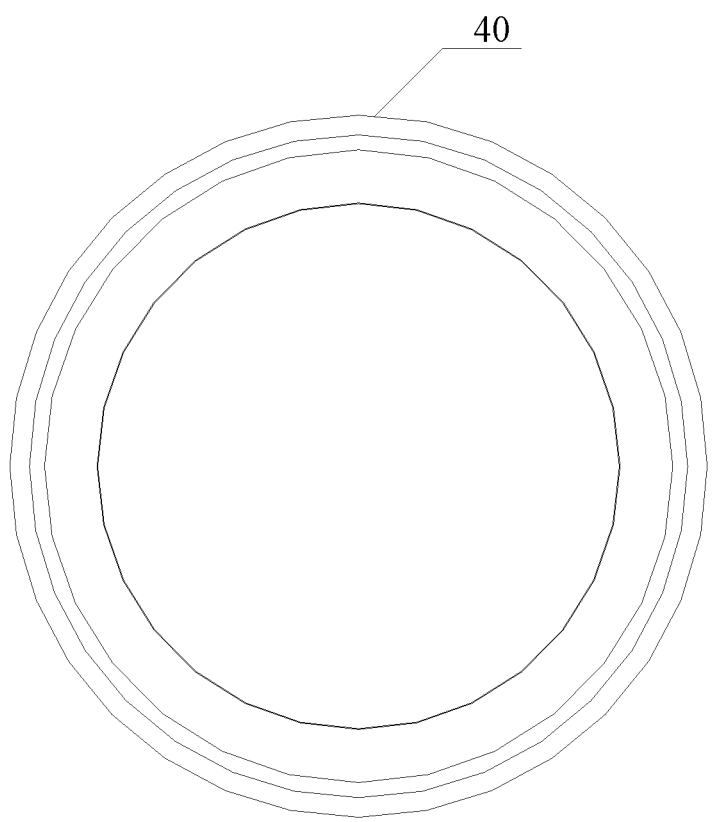
FIG. 5C is yet another structural schematic diagram of the sealing component of the present disclosure.
Figure 6:
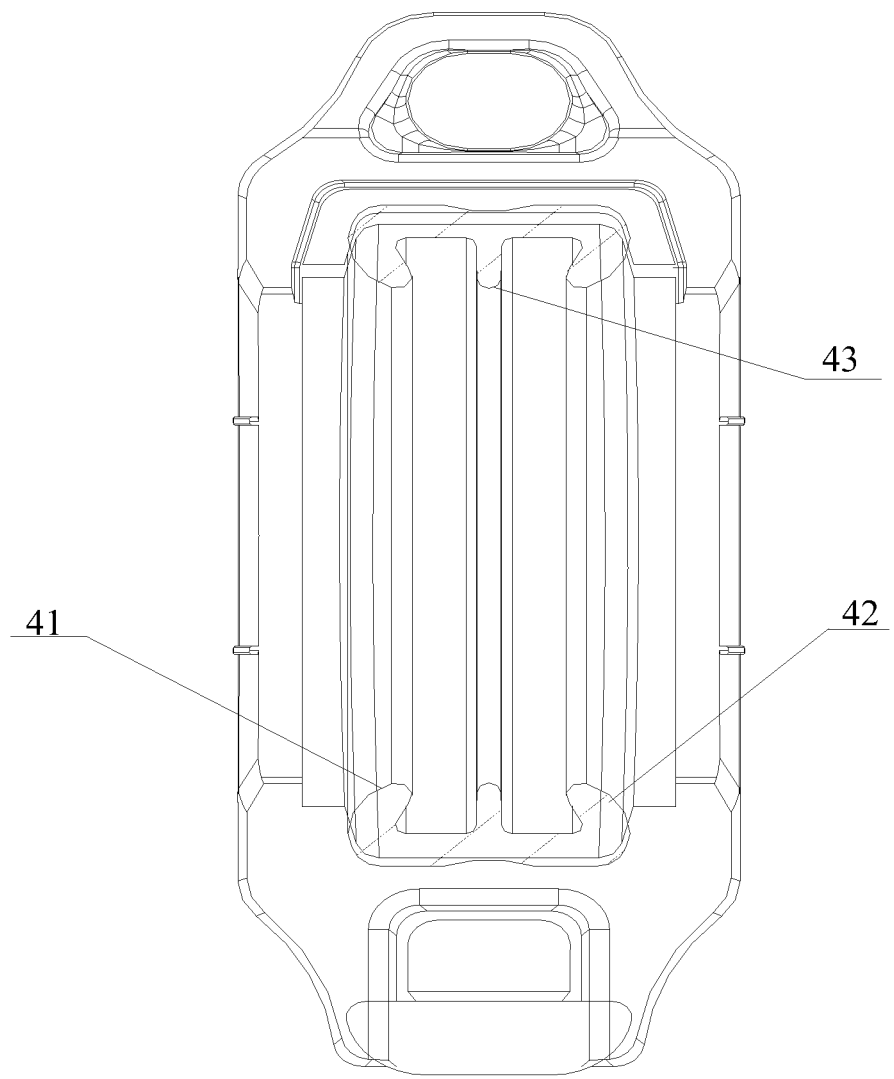
FIG. 6 is a schematic diagram showing a connection between a sealing component and a clamp connector of the present disclosure.

In order to clearly and definitely illustrate the objective, technical solutions, and advantages of the present disclosure, the present disclosure will be described in detail hereinafter with reference to the drawings and embodiments. It should be understood that the specific embodiments described herein are merely used for explaining the present disclosure, rather than limiting the present disclosure.

As shown in FIG. 1-FIG. 3B, the present disclosure provides a clamp connector for tightly clamping two connected pipes. The clamp connector includes the first clamp ring component 10 and the second clamp ring component 20. In a practical application, a sealing ring is provided between the two clamp ring components, and when the two connected pipes are inserted, two corresponding ends of the first clamp ring component 10 and the second clamp ring component 20 are tightly locked, thereby realizing a sealing and fixing effect.

The first clamp ring component 10 includes the first end portion 11 and the second end portion 12. The first end portion 11 is provided with two stress structures 111, 112. The open mounting space 113 is provided between the two stress structures 111, 112.

The second clamp ring component 20 includes the third end portion 21 and the fourth end portion 22, The third end portion 21 is provided with the fixing structure 211 capable of being mounted in or dismounted from the mounting space 113, and the fixing structure is fitted with the two stress structures 111, 112.

Both the second end portion 12 of the first clamp ring component 10 and the fourth end portion 22 of the second clamp ring component 20 are provided with mechanisms fitted with each other for locking, and when the second end portion 12 and the fourth end portion 22 are tightly locked, the two stress structures 111, 112 and the fixing structure 211 are in a squeezed and close fit state.

The first end portion 11 and the third end portion 21 form a pre-fitting structure. In a practical application, the first end portion 11 and the third end portion 21 are pre-mounted first. The second end portion 12 and the fourth end portion 22 are in a relatively free state, namely, the second end portion 12 and the fourth end portion 22 can be freely rotated by a certain angle for conveniently connecting the connected pipes. After the connected pipes are connected, the second end portion 12 and the fourth end portion 22 are tightly locked. At that time, the two stress structures 111, 112 and the fixing structure 211 are in a squeezed and close fit state, and the first end portion 11 and the third end portion 21 correspondingly present a tightly locked state.

As for the second end portion 12 of the first clamp ring component 10 and the fourth end portion 22 of the second clamp ring component 20, those skilled in the art can adaptively use a locking mechanism such as the existing structure of a bolt and a bolt hole. Since the locking of the second end portion 12 and the fourth end portion 22 are not a main point of the present disclosure, it will not be described here.

In one embodiment according to the present disclosure, the mounting space 113 is a U-shaped structure. Since the mounting structure is open, the clamp connector of the present disclosure can save a certain amount of raw material. On the other hand, a body of the first clamp ring component 10 and the two stress structures 111, 112 can be integrally formed into one piece by employing a sand mold. The groove is formed without a mold core, saving the cost of producing the mold core, simplifying the manufacture process, and meanwhile ensuring a location degree of the mounting space 113 well.

In the above embodiment, the fixing structure 211 includes the inserting component 212 and the limiting mechanism 213 provided at an end of the inserting component 212. A width of the inserting component 212 is slightly less than a width of the mounting space 113, so that the inserting component 212 can be conveniently provided in the mounting space 113, and the stability is ensured. In the meantime, a width of the limiting mechanism 213 is larger than the width of the mounting space 113, so that the limiting mechanism 213 can keep its position relatively unchanged and exert a limiting effect when the two stress structures 111, 112 interact with the limiting mechanism 213 by a relatively large force.

In one embodiment, in order to ensure sufficient stress intensities of the limiting mechanism 213 and the two stress structures 111, 112, edges of the limiting mechanism 213 of the present disclosure are designed to substantially coincide with outer edges of the two stress structures 111, 112.

In another embodiment, the edges of the limiting mechanism 213 are located at interiors of the outer edges of the two stress structures 111, 112. The setting relates to the material and thickness of the limiting mechanism 213, as long as the limiting mechanism can bear corresponding stress.

The inserting component 212 and the limiting mechanism 213 are integrally formed into one piece, and an included angle between the inserting component 212 and the limiting mechanism 213 is slightly larger than 90°. As one of the preferred options, the included angle between the inserting component 212 and the limiting mechanism 213 ranges from 97° to 115°. For example, the included angle of 105° is the best option. As for the setting of the angle, considering a pressure direction when clamped and a convenience of mounting and dismounting, a shape having the included angle of slightly larger than 90° can bear larger pressure. If the angle is overlarge, then the stress is not stable. Thus the included angle is set from 97° to 115° accordingly. During the inventor's test process, when the included angle between the two components is set to be 105°, the clamp connector of the present disclosure has a better stability and convenience of mounting and dismounting.

When the fourth end portion 22 is released from a locked state, the end portion can be rotated to an effective position to make the fixing structure 211 detach from the mounting space 113.

The present disclosure further provides a connecting component including the above-mentioned clamp connector. The clamp connector further includes the accommodating cavity 30, and the connecting component further includes the elastic sealing component 40 provided in the accommodating cavity 30. According to FIG. 2B, FIG. 3B, and FIG. 4-FIG. 6, two ends of the sealing component 40 are respectively provided with the first sealing ring 41 and the second sealing ring 42, and the first sealing ring 41 and the second sealing ring 42 tilt inward along an axis direction of the accommodating cavity 30. When connected pipe heads are inserted in the first sealing ring 41 and the second sealing ring 42, the first sealing ring 41 and the second sealing ring 42 can tightly fit with the connected pipes and ensure the sealing property.

Preferably, the third sealing ring 43 is provided at a middle position of the sealing component 40, a fifth end portion of the sealing ring 43, a sixth end portion of the first sealing ring 41 and a seventh end portion of the second sealing ring 42 are on a same annular surface, namely, the third sealing ring 43, the first sealing ring 41 and the second sealing ring 42 have a same inner diameter. The third sealing ring 43 is generally located at a joint of the connected pipes, and the fifth end portion of the third sealing ring 43 in a free state, the sixth end portion of the first sealing ring 41 and the seventh end portion of the second sealing ring 42 are located on a same horizontal plane. When the connected pipes are inserted, the sealing property at the joint is further ensured. Based on the above-mentioned structure of the sealing component 40, the technical solution of the present disclosure can realize a quick insertion, and has a relatively high inserting and mounting efficiency.

The present disclosure is flexible in mounting. For example, the first clamp ring component 10 is placed at a bottom of the connected pipe, and then the third end portion 21 of the second clamp ring component 20 and the first end portion 11 of the first clamp ring component 10 are mounted and fitted with each other. Alternatively, the third end portion 21 is connected to the first end portion 11 in advance, making the two stress structures 111, 112 and the fixing structure in a slight pre-pressure state, then the connected pipes are inserted, the fourth end portion 22 and the second end portion 12 are locked for fixing.

Figure 7A:
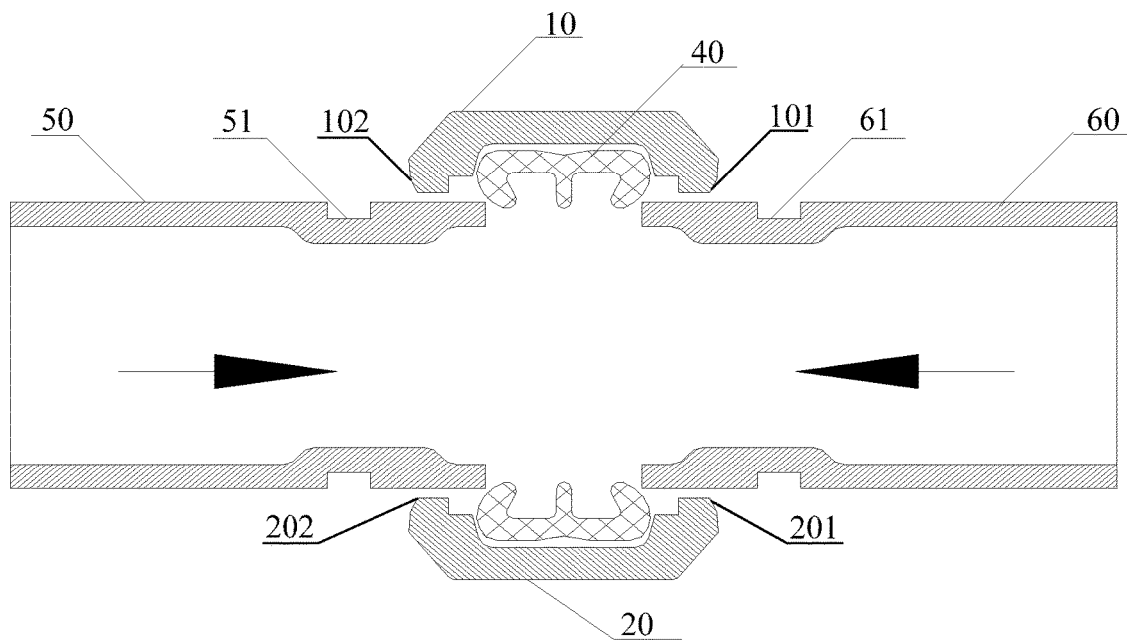
FIG. 7A is a schematic diagram showing a mounting process of a pipe according to an embodiment of the present disclosure.

In one embodiment, according to FIG. 7A, it is an objective of the present disclosure to fixedly connect the pipe 50 to the pipe 60 and ensure the sealing property. In order to improve the fixing property, the first clamp ring component 10 is provided with the first clamp edge 101 and the second clamp edge 102 formed by bending inward along a radial direction of the clamp connector. The first clamp edge 101 and second clamp edge 102 each comprise an inner annular surface extending in a radial direction and perpendicular to the central axis of the clamp connector. The second clamp ring component 20 is provided with the third clamp edge 201 and the fourth clamp edge 202 formed by bending inward along a radial direction of the clamp connector. The third clamp edge 201 and fourth clamp edge 202 each comprise an inner annular surface extending in a radial direction and perpendicular to the central axis of the clamp connector. The end surfaces of the first, second, third and fourth clamp edges are slightly lower than an inner annular surface of the sealing component to ensure a close fit between the clamp edges and the sealing component. Accordingly, the pipe 50 is provided with the clamp groove 51 fitting with the clamp edges at the outer edges of the first clamp ring component 10 and the second clamp ring component 20, and the pipe 60 is provided with the clamp groove 61 fitting with the clamp edges at the outer edges of the first clamp ring component 10 and the second clamp ring component 20. During the mounting, the pipe 50 or the pipe 60 is inserted into the sealing component 40 along an arrow direction. Since both the inner diameters of the first sealing ring 41 and the second sealing ring and the inner diameter of the third sealing ring 43 are slightly less than an outer diameter of the pipe 50 or 60, a sealing structure is formed when the pipe 50 is inserted into the sealing component 40.

Figure 7B:
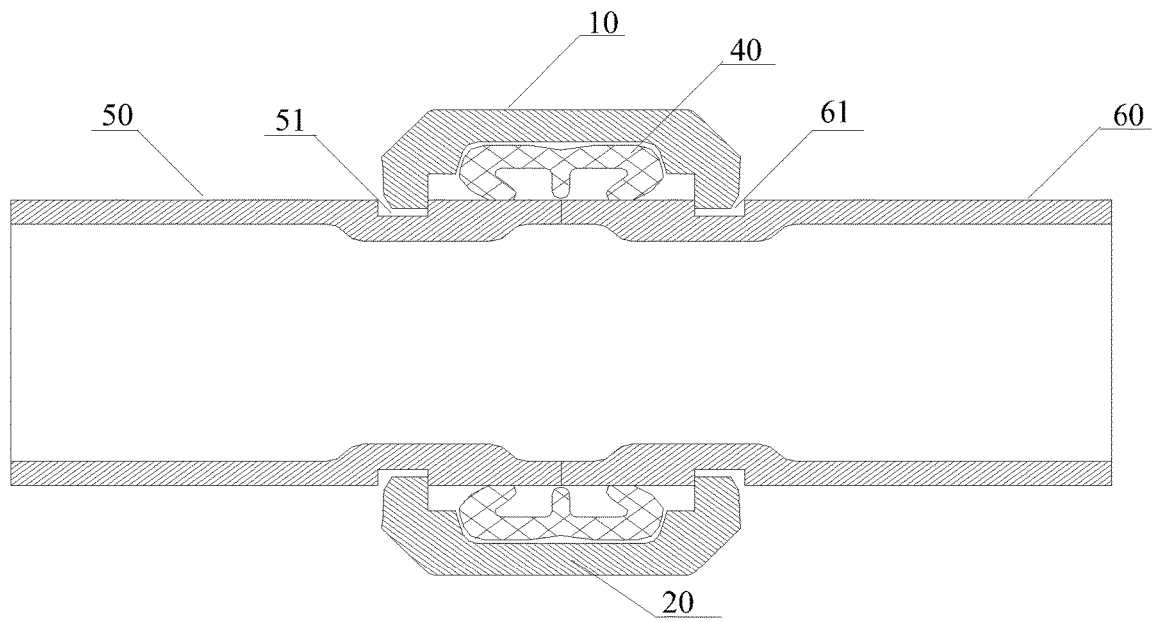
FIG. 7B is a schematic diagram showing a cooperation between a pipe and a connecting component according to an embodiment of the present disclosure.
Figure 7C:
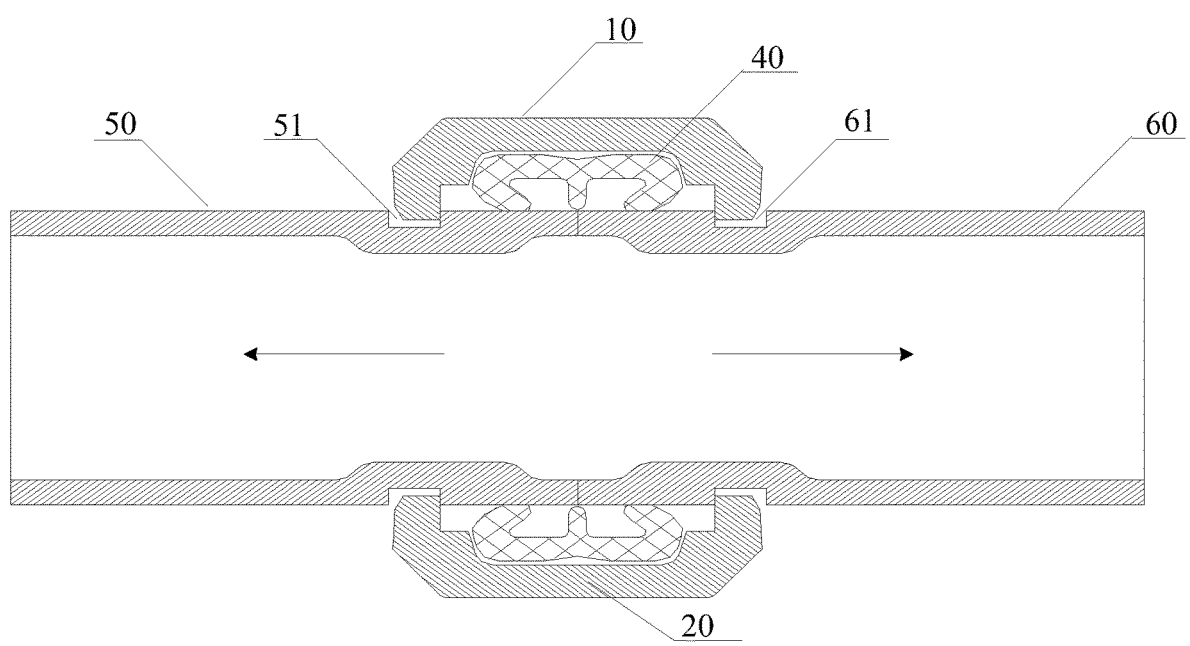
FIG. 7C is a schematic diagram showing a dismounting process of a pipe according to an embodiment of the present disclosure.

Subsequently, the clamp groove 51 corresponding to the pipe 50 is adaptively placed on the second clamp edge 102 and the fourth clamp edge 202 of the corresponding clamp connector. Then the other pipe 60 is correspondingly inserted, pre-forming a sealing structure with the sealing component 40. Subsequently, the clamp groove 61 corresponding to the pipe 60 is adaptively placed on the first clamp edge 101 and the third clamp edge 201 of the corresponding clamp connector. At last, the second end portion 12 and the fourth end portion 22 is tightly locked for fixing, according to FIG. 7B. Since the pipes 50 and 60 of the present disclosure have already pre-formed the sealing structure with the sealing component 40, only a relatively small force applied by the clamp connector to an outer ring surface of the sealing component is required, after the two end portions of the clamp connector are tightly locked. Likewise, the third sealing ring 43 is located at a joint of the pipe 50 and the pipe 60, and the pipe 50 is connected to the pipe 60 at the joint, making the sealing ring in a compressed state to form the sealing structure. In this way, the present disclosure exceedingly improves the sealing property and facilitates the mounting. If the pipe 50 and the pipe 60 are required to be disconnected, only the third end portion 21 and the fourth end portion 22 need to be released for taking out the two pipes along directions shown in FIG. 7C, realizing a quick insertion and release.

Certainly, the present disclosure may have various other embodiments. Those skilled in the art can make corresponding modifications and changes according to the present disclosure, without departing from the spirit and essence of the present disclosure. Those corresponding modifications and changes should be considered as falling within the protective scope defined by the appended claims of the present disclosure.

What is claimed is:

1. A clamp connector for clamping two connected pipes, comprising:
    a first clamp ring component, wherein the clamp ring component comprises a first end portion and a second end portion, the first end portion is provided with two stress structures, and an open mounting space is provided between the two stress structures, the first clamp ring component is provided with a first clamp edge and a second clamp edge, the first clamp edge and the second clamp edge are formed by bending inward along a radial direction of the clamp connector;
    a second clamp ring component, wherein the second clamp ring component comprises a third end portion and a fourth end portion, the third end portion is provided with a fixing structure, the fixing structure is mounted in or dismounted from the open mounting space, and the fixing structure fits with the two stress structures, the second clamp ring component is provided with a third clamp edge and a fourth clamp edge, the third clamp edge and the fourth clamp edge are formed by bending inward along the radial direction of the clamp connector; and wherein the fixing structure comprises an inserting component and a limiting mechanism provided at an end of the inserting component, a width of the inserting component is less than a width of the open mounting space, and a width of the limiting mechanism is larger than the width of the mounting space;
    when the first clamp ring component and the second clamp ring component forms a ring, the inserting component is placed in the open mounting space, a first surface of the limiting mechanism touches one of the two stress structures, and a second surface of the limiting mechanism touches the other stress structure, wherein the first surface and the second surface are flat surfaces; and
    both the second end portion of the first clamp ring component and the fourth end portion of the second clamp ring component are provided with mechanisms fitted with each other for locking, and when the second end portion is pressed against the fourth end portion to create a locked state, the first surface becomes a first flush surface against the one of the two stress structures and the second surface becomes a second flush surface against the other stress structure;
    wherein the first clamp edge and second clamp edge each comprise an inner annular surface extending radially and perpendicular to a central axis of the clamp connector, and wherein the third clamp edge and fourth clamp edge each comprise an inner annular surface extending radially and perpendicular to the central axis of the clamp connector.

2. The clamp connector according to claim 1, wherein the open mounting space is a U-shaped structure.

3. The clamp connector according to claim 2, wherein when the second end portion is released from a locked state, the second end portion is rotated to an effective position to make the fixing structure detach from the open mounting space.

4. The clamp connector according to claim 1, wherein edges of the limiting mechanism coincide with outer edges of the two stress structures.

5. The clamp connector according to claim 4, wherein the inserting component and the limiting mechanism are integrally formed into one piece, and an included angle between the inserting component and the limiting mechanism is larger than 90°.

6. The clamp connector according to claim 4, wherein an included angle between the inserting component and the limiting mechanism ranges from 97° to 115°.

7. The clamp connector according to claim 4, wherein when the second end portion is released from a locked state, the second end portion is rotated to an effective position to make the fixing structure detach from the open mounting space.

8. The clamp connector according to claim 1, wherein edges of the limiting mechanism are located at interiors of outer edges of the two stress structures.

9. The clamp connector according to claim 8, wherein the inserting component and the limiting mechanism are integrally formed into one piece, and an included angle between the inserting component and the limiting mechanism is larger than 90°.

10. The clamp connector according to claim 8, wherein an included angle between the inserting component and the limiting mechanism ranges from 97° to 115°.

11. The clamp connector according to claim 8, wherein when the second end portion is released from a locked state, the second end portion is rotated to an effective position to make the fixing structure detach from the open mounting space.

12. The clamp connector according to claim 1, wherein the inserting component and the limiting mechanism are integrally formed into one piece, and an included angle between the inserting component and the limiting mechanism is larger than 90°.

13. The clamp connector according to claim 1, wherein an included angle between the inserting component and the limiting mechanism ranges from 97° to 115°.

14. The clamp connector according to claim 1, wherein when the second end portion is released from a locked state, the second end portion is rotated to an effective position to make the fixing structure detach from the open mounting space.

15. The clamp connector according to claim 1, wherein when the second end portion is released from a locked state, the second end portion is rotated to an effective position to make the fixing structure detach from the open mounting space.

16. A connecting component comprising the clamp connector according to claim 14, wherein the clamp connector further comprises an accommodating cavity, the connecting component further comprises an elastic sealing component provided in the accommodating cavity, two ends of the sealing component are respectively provided with a first sealing ring and a second sealing ring, the first sealing ring and the second sealing ring tilt inward along an axis direction of the accommodating cavity.

17. The connecting component according to claim 16, wherein a third sealing ring is provided at a middle position of the sealing component, a fifth end portion of the sealing ring, a sixth end portion of the first sealing ring and a seventh end portion of the second sealing ring have a same inner diameter; and inner diameters of the first sealing ring and the second sealing ring and the third sealing ring are less than an outer diameter of each of the two connected pipes.

18. The connecting component according to claim 16, wherein the open mounting space is a U-shaped structure.

* * * * *